US009958672B2

United States Patent
Yoneima et al.

(10) Patent No.: US 9,958,672 B2
(45) Date of Patent: May 1, 2018

(54) OPTICAL SCANNING DEVICE, IMAGE FORMING APPARATUS

(71) Applicant: KYOCERA Document Solutions Inc., Osaka-shi, Osaka (JP)

(72) Inventors: Yoshinobu Yoneima, Osaka (JP); Aiichiro Otana, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days. days.

(21) Appl. No.: 15/551,835

(22) PCT Filed: Feb. 12, 2016

(86) PCT No.: PCT/JP2016/054110
§ 371 (c)(1),
(2) Date: Aug. 17, 2017

(87) PCT Pub. No.: WO2016/133015
PCT Pub. Date: Aug. 25, 2016

(65) Prior Publication Data
US 2018/0067305 A1 Mar. 8, 2018

(30) Foreign Application Priority Data

Feb. 20, 2015 (JP) ................................. 2015-032225

(51) Int. Cl.
*G03G 15/01* (2006.01)
*G03G 15/04* (2006.01)
(Continued)

(52) U.S. Cl.
CPC ......... *G02B 26/125* (2013.01); *G02B 26/121* (2013.01); *G03G 15/043* (2013.01);
(Continued)

(58) Field of Classification Search
CPC ........... G03G 15/011; G03G 15/04072; G03G 15/0409; G03G 15/043; G02B 7/00; G02B 7/008; G02B 26/125; G02B 26/121
See application file for complete search history.

(56) References Cited

U.S. PATENT DOCUMENTS

2010/0033775 A1* 2/2010 Miyanagi ................. G02B 5/08
358/505
2015/0331234 A1* 11/2015 Tomioka ................ G03G 15/04
347/118

FOREIGN PATENT DOCUMENTS

JP 2011069868 A 4/2011

* cited by examiner

*Primary Examiner* — Joseph S Wong
(74) *Attorney, Agent, or Firm* — Alleman Hall Creasman & Tuttle LLP

(57) ABSTRACT

To restrict an angle change of a reflection surface of a reflection member that reflects a scanning light beam, an optical scanning device includes a first support portion that supports a reflection mirror at one point at an end in a longitudinal direction of the reflection mirror, a second support portion that supports the reflection mirror at a plurality of points at the other end, a reinforcement portion that reinforces a structure of the second support portion side of a housing in the longitudinal direction of the reflection mirror, compared to a structure of the first support portion side of the housing, one first fixing portion that is used to fix the housing to an image forming apparatus on the first support portion side, and a plurality of second fixing portions that are used to fix the housing to the image forming apparatus on the second support portion side.

6 Claims, 4 Drawing Sheets

(51) Int. Cl.
  *G03G 15/043* (2006.01)
  *G02B 26/12* (2006.01)
(52) U.S. Cl.
  CPC ... *G03G 15/0409* (2013.01); *G03G 15/04072* (2013.01); *G03G 15/011* (2013.01)

OPTICAL SCANNING DEVICE, IMAGE FORMING APPARATUS

TECHNICAL FIELD

The present invention relates to an optical scanning device and an image forming apparatus.

BACKGROUND ART

An electrophotographic image forming apparatus includes an optical scanning device that emits a light beam to form an electrostatic latent image on an image carrying member. In this type of optical scanning device, the light beam emitted from a light source is scanned in a predetermined direction by an optical scanning member such as a polygon mirror. Subsequently, the light beam scanned by the optical scanning member is reflected by one or more reflection members that are elongated along the scanning direction of the light beam, and is guided to the image carrying member. Opposite ends of the reflection members in the longitudinal direction are supported by support portions of a housing of the optical scanning device.

Meanwhile, when the support portions are deformed due to a temperature change, angles of reflection surfaces of the reflection members may change. When this happens, the position of the light beam scanned on the image carrying member may be shifted in the sub scanning direction that is orthogonal to the scanning direction of the light beam on the image carrying member. In particular, in an image forming apparatus of a so-called tandem type including a plurality of image forming units, a color shift in the sub scanning direction may occur on a color image which is formed as a plurality of toner images formed by the image forming units are overlaid with each other. On the other hand, there is known a configuration where an end portion of the reflection member on a large temperature change side in the longitudinal direction of the reflection member is supported at one point, and an end portion of the reflection member on a small temperature change side is supported at a plurality of points (see, for example, PTL 1).

CITATION LIST

Patent Literature

[PTL 1] Japanese Laid-Open Patent Publication No. 2011-69868

SUMMARY OF THE INVENTION

Problems to be Solved by the Invention

However, if there is no difference in strength of the housing between the opposite ends of the reflection member in the optical scanning device, a deformation due to a temperature change may occur not only to a support portion supporting the reflection member at one point but also to a support portion supporting the reflection member at a plurality of points.

The present invention has been made in view of such conventional circumstances, and it is an object of the present invention to provide an optical scanning device and an image forming apparatus that can restrict an angle change of the reflection surface of the reflection member that reflects the scanning light beam.

Solution to the Problems

An optical scanning device according to an aspect of the present invention includes an optical scanning member, a driving portion, a reflection member, a housing, a first support portion, a second support portion, a reinforcement portion, one first fixing portion, and a plurality of second fixing portions. The optical scanning member scans a light beam. The driving portion drives the optical scanning member. The reflection member is an elongated member that reflects the light beam scanned by the optical scanning member. In the housing, the optical scanning member, the driving portion, and the reflection member are disposed. The first support portion is provided in the housing and supports the reflection member at one point at an end in a longitudinal direction of the reflection member. The second support portion is provided in the housing and supports the reflection member at a plurality of points at the other end in the longitudinal direction of the reflection member. The reinforcement portion reinforces a structure of the second support portion side of the housing in the longitudinal direction of the reflection member, compared to a structure of the first support portion side of the housing. The first fixing portion is provided in the housing and used to fix the housing to an image forming apparatus on the first support portion side in the longitudinal direction of the reflection member. The second fixing portions are provided in the housing and used to fix the housing to the image forming apparatus on the second support portion side in the longitudinal direction of the reflection member.

An image forming apparatus according to another aspect of the present invention includes the optical scanning device.

Advantageous Effects of the Invention

According to the present invention, it is possible to provide an optical scanning device and an image forming apparatus that can restrict an angle change of the reflection surface of the reflection member that reflects the scanning light beam.

DESCRIPTION OF EMBODIMENTS

The following describes an embodiment of the present invention with reference to the accompanying drawings for the understanding of the invention. It should be noted that the following embodiment is an example of a specific embodiment of the present invention and should not limit the technical scope of the present invention.

Figure 1:
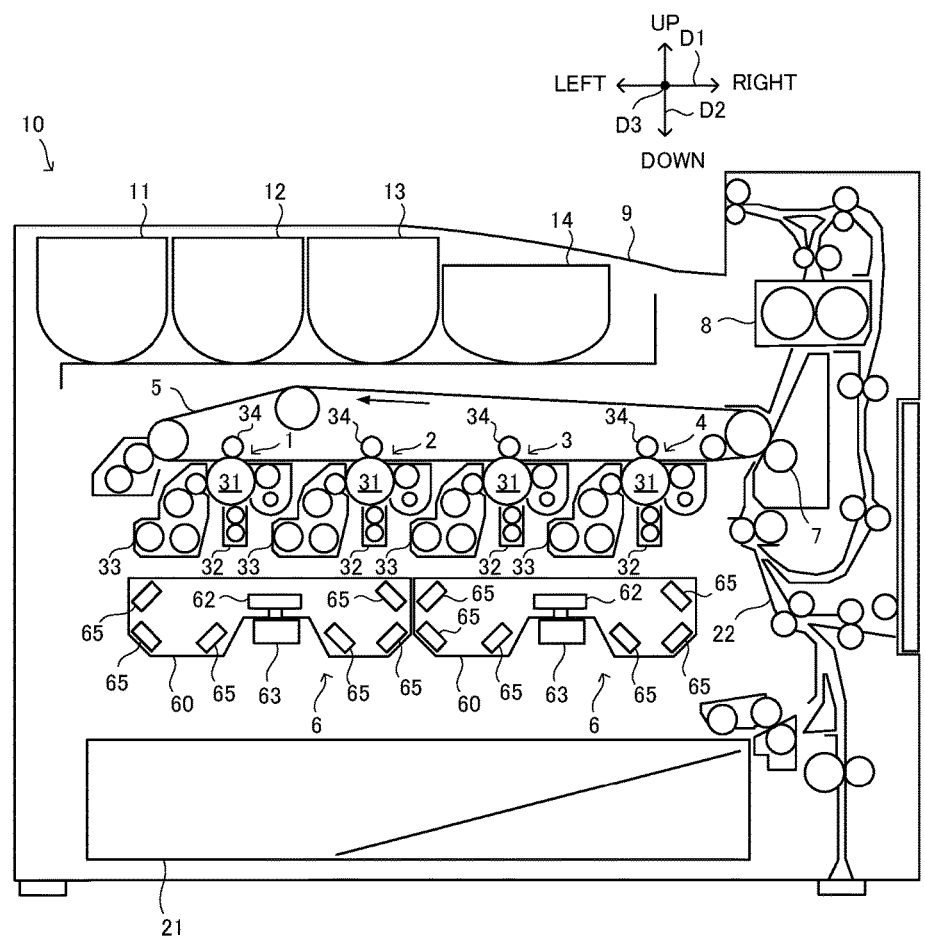
FIG. 1 is a diagram showing a configuration of an image forming apparatus according to an embodiment of the present invention.
Figure 2:
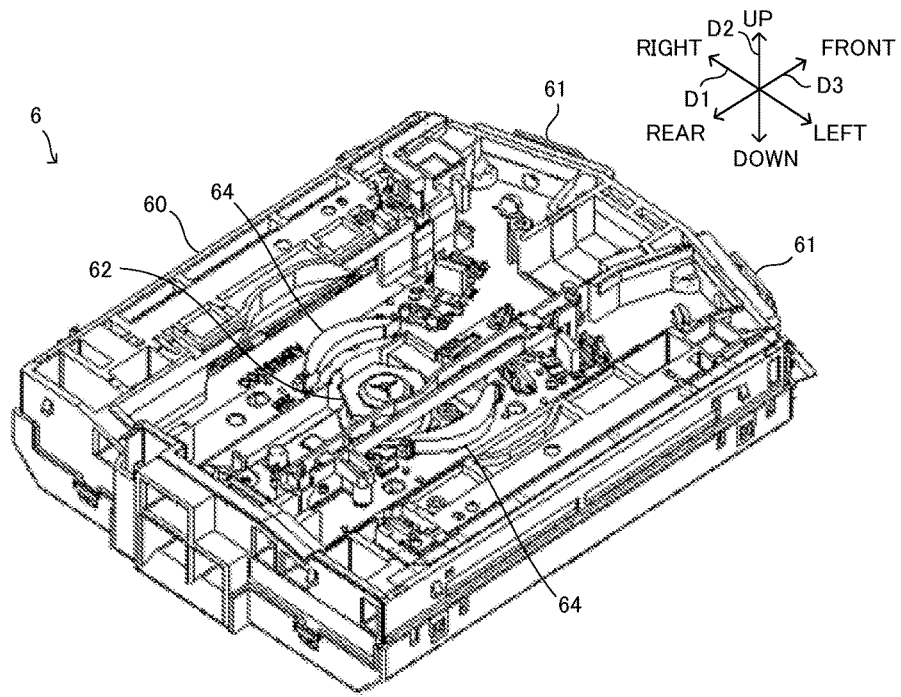
FIG. 2 is a perspective view, viewed from above, of an optical scanning device according to an embodiment of the present invention.

As shown in FIG. 1, an image forming apparatus 10 includes a plurality of image forming units 1 to 4, an intermediate transfer belt 5, optical scanning devices 6, a secondary transfer roller 7, a fixing device 8, a sheet discharge tray 9, toner containers 11 to 14, a sheet feed cassette 21, and a conveyance path 22. The image forming apparatus 10 is a printer that forms a color or monochrome image on a sheet supplied from the sheet feed cassette 21 along the conveyance path 22, and discharges the sheet to the sheet discharge tray 9. It is noted that in the following description, a left-right direction D1, an up-down direction D2, and a front-rear direction D3 that are defined in the drawings may be used.

In the present embodiment, the image forming apparatus 10 includes two optical scanning devices 6 in correspondence with the image forming units 1 to 4. On the other hand, a configuration where four optical scanning devices are provided individually in correspondence with the image forming units 1 to 4 respectively, and a configuration where one optical scanning device is provided in correspondence with the image forming units 1 to 4, may be considered as other embodiments. In addition, the image forming apparatus of the present invention is not limited to a printer, but may be a facsimile, a copier, or a multifunction peripheral, for example.

The image forming units 1 to 4 are arranged in alignment along the intermediate transfer belt 5, and constitute an image forming portion of a so-called tandem system. Specifically, the image forming units 1 to 4 form toner images that correspond to Y (yellow), C (cyan), M (magenta), and K (black), respectively. Each of the image forming units 1 to 4 is an electrophotographic image forming unit including a photoconductor drum 31, a charging portion 32, a developing portion 33, and a primary transfer roller 34.

In the image forming units 1 to 4, the photoconductor drums 31 are charged by the charging portions 32, then electrostatic latent images corresponding to image data are formed on the photoconductor drums 31 by light beams emitted from the optical scanning devices 6. Thereafter, the electrostatic latent images formed on the photoconductor drums 31 are developed by developer such as toner in the developing portion 33. Subsequently, the toner images formed on the photoconductor drums 31 are transferred to the intermediate transfer belt 5 in sequence by the primary transfer rollers 34 This allows a color or monochrome toner image to be formed on the intermediate transfer belt 5. Thereafter, the toner image is transferred from the intermediate transfer belt 5 to a sheet by the secondary transfer roller 7, and is fused and fixed to the sheet by the fixing device 8.

Next, the optical scanning devices 6 are described. The optical scanning devices 6 form electrostatic latent images corresponding to the image data, on the surfaces of the photoconductor drums 31 by scanning the surfaces of the photoconductor drums 31 with laser beams. Specifically, as shown in FIG. 1 to FIG. 5, each of the optical scanning devices 6 includes light sources 61, a polygon mirror 62, a motor 63, an fθ lens 64, reflection mirrors 65, and a housing 60 in which these components are disposed. It is noted that although cover members are attached to the front and rear surfaces of the housing 60, the cover members are omitted in FIG. 2 to FIG. 5.

Figure 4:
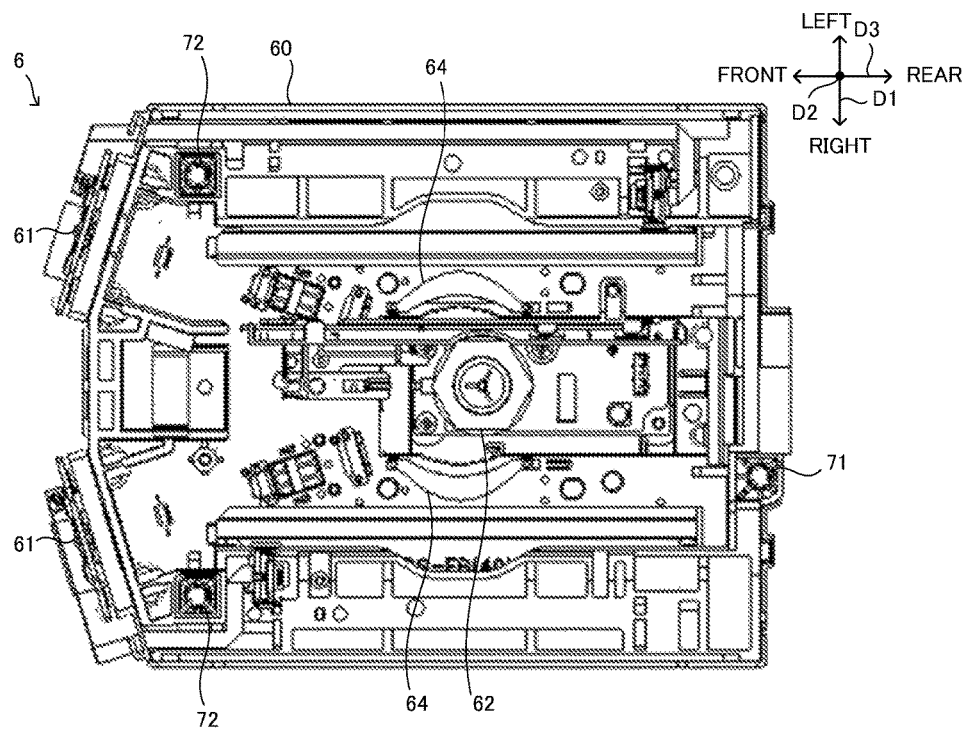
FIG. 4 is a plan view of the optical scanning device according to an embodiment of the present invention.

The light sources 61 are, for example, laser diodes that each emit a laser beam. The polygon mirror 62 is a rotary polygon mirror that includes six reflection surfaces for reflecting two laser beams emitted from two light sources 61, and is axially supported so as to be rotatable by the motor 63. It is noted that the polygon mirror 62 is an example of the optical scanning member. The motor 63 is an example of the driving portion that rotationally drives the polygon mirror 62. The polygon mirror 62 is rotationally driven by the motor 63 so as to cause the two laser beams emitted from the two light sources 61 to scan in different directions. Hereinafter, the scanning direction of the laser beams scanned by the polygon mirror 62 is referred to as a main scanning direction (a direction parallel to the front-rear direction D3 in FIG. 2), and a direction that is orthogonal to the main scanning direction on the surface of the photoconductor drum 31 is referred to as a sub scanning direction. It is noted that as shown in FIG. 4, in each of the housings 60, the polygon mirror 62 and the motor 63 are disposed more on the rear side than the center of the reflection mirrors 65 in the longitudinal direction thereof.

The fθ lens 64 is a scanning lens that causes the laser beams scanned by the polygon mirror 62 in the main scanning direction to be focused on the surfaces of the photoconductor drums 31 that are irradiation objects, and scanned at a uniform scanning speed. A plurality of reflection mirrors 65 are disposed in correspondence with the laser beams scanned by the polygon mirror 62. In each optical scanning device 6, three reflection mirrors are disposed in correspondence with the laser beams, and six reflection mirrors are disposed in total. The reflection mirrors 65 are reflection members that are elongated in the main scanning direction in which the laser beams are scanned by the polygon mirror 62, and are supported by the housing 60 at opposite ends in the longitudinal direction. The reflection mirrors 65 reflect, in sequence, the laser beams that have passed through the fθ lens 64, thereby guiding the beams to the surfaces of the photoconductor drums 31.

Meanwhile, in the housing 60 of each optical scanning device 6, the reflection mirrors 65 are supported by support portions that are provided at opposite ends of the reflection mirrors 65 in the longitudinal direction. However, the support portions may be deformed due to a temperature change, and this may lead to changes of the angles of the reflection surfaces of the reflection mirrors 65. When this happens, the positions of the light beams scanned on the photoconductor drum 31 may be shifted in the sub scanning direction. In particular, in the image forming apparatus 10 including a plurality of image forming units 1 to 4, a color shift in the sub scanning direction may occur on a color image which is formed as a plurality of toner images formed by the image forming units 1 to 4 are overlaid with each other.

Figure 6:
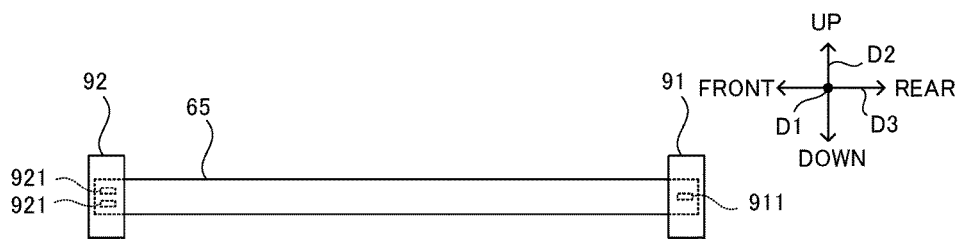
FIG. 6 is a diagram for explaining a support structure of a reflection member in the optical scanning device according to an embodiment of the present invention.
Figure 7A:
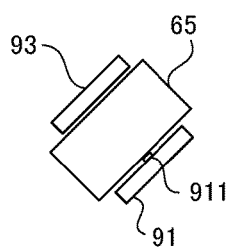
FIG. 7A is a diagram for explaining the support structure of the reflection member in the optical scanning device according to an embodiment of the present invention.
Figure 7B:
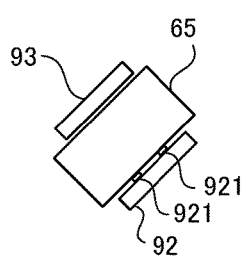
FIG. 7B is a diagram for explaining the support structure of the reflection member in the optical scanning device according to an embodiment of the present invention.

On the other hand, as shown in FIG. 6, FIG. 7A and FIG. 7B, each of the optical scanning devices 6 includes a first support portion 91 and a second support portion 92 for each of the reflection mirrors 65. The first support portion 91 supports the reflection mirror 65 at one point at an end in the longitudinal direction of the reflection mirror 65. The second support portion 92 supports the reflection mirror 65 at a plurality of points at the other end in the longitudinal direction of the reflection mirror 65. It is noted that FIG. 6 shows a reflection mirror 65 viewed from a direction orthogonal to the reflection surface. FIG. 7A and FIG. 7B are side views of the reflection mirror 65.

As shown in FIG. 6 and FIG. 7A, the first support portion 91 includes one projection portion 911 that is in contact with the reflection surface of the reflection mirror 65. The end of the reflection mirror 65 on the first support portion 91 side is supported by the projection portion 911 of the first support portion 91 by being biased by a biasing member 93, such as a plate spring, toward the first support portion 91. In this way, the first support portion 91 supports the reflection mirror 65 by one projection portion 911 as one-point support. With this configuration, the angle of the reflection surface of the reflection mirror 65 is difficult to change when a deformation occurs due to a temperature change.

On the other hand, as shown in FIG. 6 and FIG. 7B, the second support portion 92 includes two projection portions 921 that are in contact with the reflection surface of the reflection mirror 65. The end of the reflection mirror 65 on the second support portion 92 side is supported by the two projection portions 921 of the second support portion 92 by being biased by the biasing member 93, such as a plate spring, toward the second support portion 92. In this way, the second support portion 92 supports the reflection mirror 65 by two projection portions 921 as the two-point support. With this configuration, the angle of the reflection surface of the reflection mirror 65 may change when a deformation occurs due to a temperature change. For example, in a case where the two projection portions 921 have different deformation amounts for a temperature change, or in a case where the inclination of the second support portion 92 changes due to a temperature change, the angle of the reflection surface of the reflection mirror 65 may change.

In view of the above, in the housing 60, the polygon mirror 62 and the motor 63 are disposed between the first support portion 91 and the second support portion 92 to be closer to the first support portion 91 than to the second support portion 92 in the longitudinal direction of the reflection mirror 65. Here, the polygon mirror 62 and the motor 63 can be a cause of a temperature rise. As a result, the second support portion 92 is located to be more difficult to be high in temperature than the first support portion 91. With this configuration, in each of the optical scanning devices 6, even in a case where the housing 60 is deformed by heat of the polygon mirror 62 and the motor 63, the deformation of the second support portion 92 is restricted, and the influence to the angle of the reflection surface of the reflection mirror 65 is restricted.

However, if there is no difference in strength of the housing 60 between the opposite ends of the reflection mirror 65 in each of the optical scanning devices 6, a deformation due to a temperature change may occur not only to the first support portion 91 but also to the second support portion 92. On the other hand, in each of the optical scanning devices 6, the structure of the housing 60 on the second support portion side in the longitudinal direction of the reflection mirror 65 has been reinforced, compared to the structure on the first support portion 91 side, and there is a difference in strength between the first support portion 91 and the second support portion 92.

Figure 3:
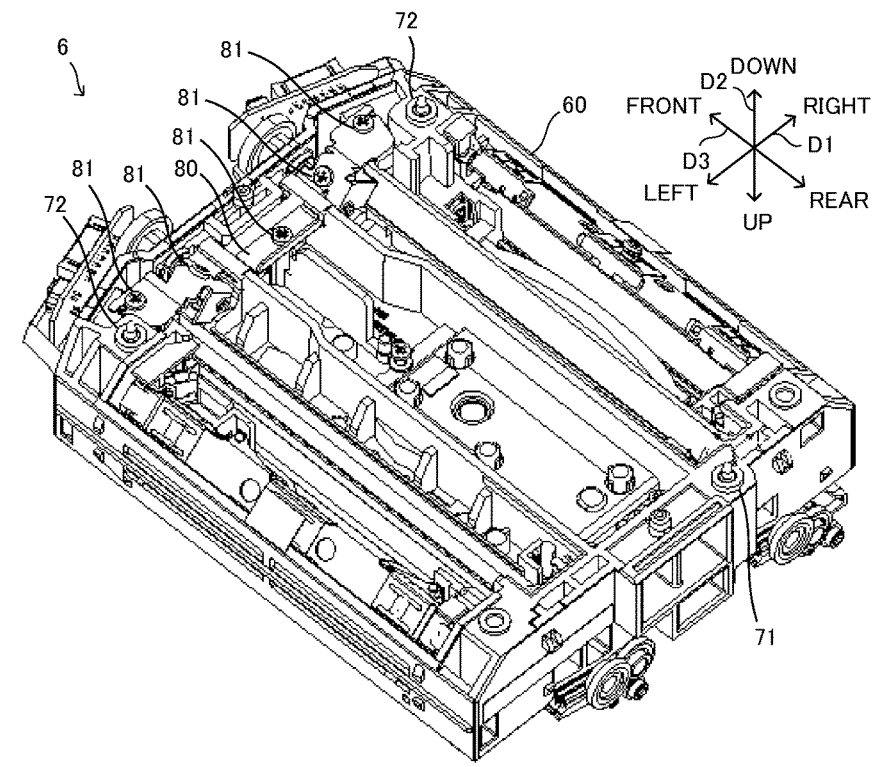
FIG. 3 is a perspective view, viewed from below, of the optical scanning device according to an embodiment of the present invention.
Figure 5:
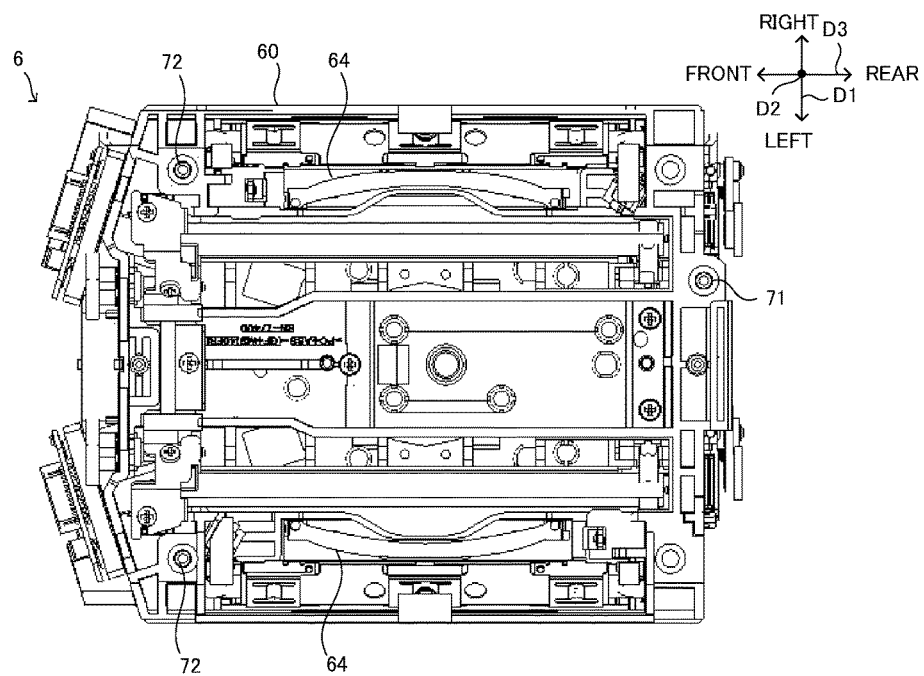
FIG. 5 is a rear view of the optical scanning device according to an embodiment of the present invention.

Specifically, as shown in FIG. 3 to FIG. 5, in the housing 60 of each of the optical scanning devices 6, one first fixing portion 71 and two second fixing portions 72 are provided such that the housing 60 is supported in the image forming apparatus 10 by three-point support. The first fixing portion 71 is used to fix the housing 60 to the image forming apparatus 10 on the first support portion 91 side in the longitudinal direction of the reflection mirror 65. The second fixing portions 72 are used to fix the housing 60 to the image forming apparatus 10 on the second support portion 92 side in the longitudinal direction of the reflection mirror 65. As one example, the first fixing portion 71 and the second fixing portions 72 are opening portions in which female screws are formed, wherein the female screws are screwed with screws when the housing 60 is fixed to the image forming apparatus 10 by screwing. It is noted that the fixing method using the first fixing portion 71 and the second fixing portions 72 is not limited to this.

When the optical scanning devices 6 are fixed to the image forming apparatus 10 by using the first fixing portion 71 and the second fixing portions 72 having the above-described configuration, the housing 60 of each optical scanning device 6 is supported at two points in the second support portion 92 side, and is supported at one point in the first support portion 91 side. As a result, in each optical scanning device 6, the second support portion 92 side of the housing 60 is higher in strength than the first support portion 91 side of the housing 60, and the second support portion 92 side is restricted from being deformed due to a temperature change or the like.

In addition, as shown in FIG. 2 to FIG. 5, a reinforcement portion 80 is provided in the housing 60 of each of the optical scanning devices 6, wherein the reinforcement portion 80 reinforces the structure of the second support portion 92 side of the housing 60 in the longitudinal direction of the reflection mirror 65, compared to the structure of the first support portion 91 side. Specifically, the reinforcement portion 80 is a metal plate disposed to extend in the left-right direction of the housing 60, in the vicinity of the second support portion 92 side of the housing 60 in the longitudinal direction of the reflection mirror 65. The reinforcement portion 80 is fixed to the housing 60 by a plurality of screws 81 at a plurality of positions along the left-right direction of the housing 60. This reinforces an end portion of the housing 60 on the second support portion 92 side in the longitudinal direction of the reflection mirror 65, and thereby restricts the second support portion 92 side from being deformed due to a temperature change or the like.

As described above, the optical scanning devices 6 have been reinforced by both the reinforcement portion 80 and the fixing structure of the optical scanning devices 6 to the image forming apparatus 10 such that the second support portion 92 side of the housing 60 is higher in strength than the first support portion 91 side. In other words, the housing 60 is structured such that the first support portion 91 side thereof is easier to be deformed than the second support portion 92 side. As a result, when the housing 60 is deformed due to, for example, a temperature change, deformation of the second support portion 92 side is restricted by deformation of the first support portion 91 side, and angle change of the reflection surface of the reflection mirror 65 is restricted. As a result, in the image forming apparatus 10, generation of a color shift in the sub scanning direction in a color image formed by the image forming units 1 to 4 is restricted It is noted that the shape of the reinforcement portion 80 is not limited to the shape shown in FIG. 3 as far as it reinforces the structure of the second support portion 92 side. For example, as another embodiment, the left and right ends of the reinforcement portion 80 may be extended to the two second fixing portions 72, and openings may be formed in the reinforcement portion 80 at positions corresponding to the two second fixing portions 72. With this configuration, when the housing 60 is fixed to the image forming apparatus 10 by using the two second fixing portions 72, the reinforcement portion 60 can be fixed together therewith, thereby further increasing the strength of the second support portion 92 side of the housing 60.

In addition, although a plurality of reflection mirrors 65 are provided in the housing 60 of each optical scanning device 6, the support structure by the first support portion 91 and the second support portion 92 does not need to be provided uniformly in all the reflection mirrors 65. For example, among three reflection mirrors 65 that reflect laser beams such that the beams are irradiated to one of the image forming units 1 to 4, one or two reflection mirrors 65 may have a reverse arrangement of the first support portion 91 and the second support portion 92 to the other reflection mirror(s) 65. For example, an adjustment mechanism that can adjust the angle of the reflection surface of any of the three reflection mirrors 65 may be disposed in the housing 60 of the optical scanning device 6 at an end on the side where the reinforcement portion 80 is provided. In that case, with regard to the reflection mirror 65 of which the angle of the reflection surface is adjusted by the adjustment mechanism, an end of the reflection mirror 65 on the reinforcement portion 80 side may be supported by the first support portion 91, and the other end may be supported by the second support portion 92.

Furthermore, in the present embodiment, the image forming apparatus 10 for color image formation including a plurality of image forming units 1 to 4 is described as one example. However, the image forming apparatus according to the present invention is applicable to an image forming apparatus for monochrome image formation including one image forming unit, as well. In the image forming apparatus for monochrome image formation, too, an inclination of a reflection surface of the reflection mirror 65 of the optical scanning device 6 may cause a positional shift of an image in the sub scanning direction during the image formation. As a result, in such an image forming apparatus for monochrome image formation, too, by restricting the angle change of the reflection surface of the reflection mirror 65 of the optical scanning device 6, the positional shift of an image in the sub scanning direction is restricted during the image formation.

The invention claimed is:

1. An optical scanning device, comprising:
   an optical scanning member configured to scan a light beam;
   a driving portion configured to drive the optical scanning member;
   a reflection member of an elongated shape configured to reflect the light beam scanned by the optical scanning member;
   a housing in which the optical scanning member, the driving portion, and the reflection member are disposed;
   a first support portion provided in the housing and configured to support the reflection member at one point at an end in a longitudinal direction of the reflection member;
   a second support portion provided in the housing and configured to support the reflection member at a plurality of points at the other end in the longitudinal direction of the reflection member;
   a reinforcement portion configured to reinforce a structure of the second support portion side of the housing in the longitudinal direction of the reflection member, compared to a structure of the first support portion side of the housing;
   one first fixing portion provided in the housing and used to fix the housing to an image forming apparatus on the first support portion side in the longitudinal direction of the reflection member; and
   a plurality of second fixing portions provided in the housing and used to fix the housing to the image forming apparatus on the second support portion side in the longitudinal direction of the reflection member.

2. The optical scanning device according to claim 1, wherein
   the driving portion is disposed at a position that is closer to the first support portion than to the second support portion in the longitudinal direction of the reflection member.

3. The optical scanning device according to claim 1, wherein
   the optical scanning member scans a plurality of light beams in different directions, and
   a plurality of the reflection members are disposed in correspondence with the plurality of light beams.

4. The optical scanning device according to claim 1, wherein
   the first support portion includes one projection portion that supports the reflection member at one point, and
   the second support portion includes two projection portions that support the reflection member at two points.

5. The optical scanning device according to claim 1, wherein
   the first fixing portion is one opening that is used when the housing is fixed to the image forming apparatus by screwing, and
   the second fixing portions are two openings that are used when the housing is fixed to the image forming apparatus by screwing.

6. An image forming apparatus, comprising the optical scanning device according to claim 1.

* * * * *